(12) United States Patent
Sankaran et al.

(10) Patent No.: US 10,708,245 B2
(45) Date of Patent: Jul. 7, 2020

(54) MACSEC FOR ENCRYPTING TUNNEL DATA PACKETS

(71) Applicant: Hewlett Packard Enterprise Development LP, Houston, TX (US)

(72) Inventors: Balaji Sankaran, Bangalore (IN); Karthikeyan Ramachandran, Bangalore (IN); Venkatavaradhan Devarajan, Bangalore (IN); Gudiputi Suma Chowdary, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 211 days.

(21) Appl. No.: 15/833,807

(22) Filed: Dec. 6, 2017

(65) Prior Publication Data

US 2019/0173860 A1 Jun. 6, 2019

(51) Int. Cl.
| | |
|---|---|
| *H04L 29/06* | (2006.01) |
| *G06F 21/60* | (2013.01) |
| *H04L 9/08* | (2006.01) |
| *H04L 12/46* | (2006.01) |

(Continued)

(52) U.S. Cl.
CPC ........ *H04L 63/0485* (2013.01); *G06F 21/602* (2013.01); *H04L 9/0838* (2013.01); *H04L 9/0841* (2013.01); *H04L 9/3273* (2013.01); *H04L 12/4633* (2013.01); *H04L 63/029* (2013.01); *H04L 63/0435* (2013.01);
(Continued)

(58) Field of Classification Search
CPC ............. H04L 63/0485; H04L 63/0428; H04L 63/162; H04L 63/0876; H04L 9/0841; H04L 63/029; H04L 63/0435; H04L 63/0471; H04L 45/66; H04L 2212/00; H04L 9/0838; H04L 9/3273; H04L 12/4633; G06F 21/602
See application file for complete search history.

(56) References Cited

U.S. PATENT DOCUMENTS

| | | |
|---|---|---|
| 8,023,478 B2 | 9/2011 | Cam-Winget et al. |
| 8,646,065 B2 | 2/2014 | Oberle et al. |
| 8,826,003 B2 | 9/2014 | Gearhart et al. |

(Continued)

OTHER PUBLICATIONS

Need further in depth explanation of security of data whilst using tunnel forwarding mode please, (Research Paper), Apr. 24, 2015, 6 Pgs.

*Primary Examiner* — Yogesh Paliwal
(74) *Attorney, Agent, or Firm* — Hewlett Packard Enterprise Patent Department (57) ABSTRACT

Examples disclosed herein relate to use of MACsec to encrypt tunnel data packets. In an example, a MACsec capable device may receive a data packet from a host device for tunneling to a controller. MACsec capable device may encapsulate the data packet with an encapsulation header to generate an encapsulated data packet. The encapsulation header may comprise a destination MAC address reserved for the controller. MACsec capable device may direct the encapsulated data packet to a MACsec engine. MACsec engine may encrypt the encapsulated data packet with the encryption key to generate an encrypted data packet. MACsec capable device may encapsulate the encrypted data packet with a first GRE header. MACsec capable device may send the encrypted data packet with the first GRE header to the controller via a GRE tunnel.

20 Claims, 5 Drawing Sheets

(51) Int. Cl.
 *H04L 9/32* (2006.01)
 *H04L 12/721* (2013.01)
(52) U.S. Cl.
 CPC .......... *H04L 63/0471* (2013.01); *H04L 45/66* (2013.01); *H04L 2212/00* (2013.01)

(56) References Cited

U.S. PATENT DOCUMENTS

| | | |
|---|---|---|
| 8,880,869 B1 | 11/2014 | Shah et al. |
| 9,154,432 B2 | 10/2015 | Doyle et al. |
| 2008/0126559 A1* | 5/2008 | Elzur .................. H04L 63/0464 709/232 |
| 2011/0252231 A1* | 10/2011 | Mishra .................. H04L 9/0891 713/160 |
| 2013/0283044 A1* | 10/2013 | Tie ............................ H04L 9/08 713/160 |
| 2017/0104850 A1 | 4/2017 | Arangasamy et al. |
| 2017/0104851 A1* | 4/2017 | Arangasamy ........... H04L 69/22 |

* cited by examiner

MACSEC FOR ENCRYPTING TUNNEL DATA PACKETS

BACKGROUND

Media Access Control Security (MACsec) is a technology that may provide secure communication on Ethernet links. MACsec may allow unauthorized Local Area Network (LAN) connections to be identified and excluded from communication within a network. MACsec may provide data confidentiality, data integrity and data origin authentication on Ethernet links between nodes.

BRIEF DESCRIPTION OF THE DRAWINGS

For a better understanding of the solution, examples will now be described, purely by way of example, with reference to the accompanying drawings, in which.

DETAILED DESCRIPTION

Media Access Control security (MACsec) is an IEEE 802 standard that specifies how to secure all or part of a LAN at the link layer. MACsec executes the encryption function in the physical layer (PHY) of an Ethernet port and offers encryption equal to that of the Ethernet port rates bi-directionally regardless of the packet size.

Enterprises are increasingly focusing on securing networks from the inside, and MACsec as layer 2 security protocol may help fill this gap. To ensure the security of wired networks, it may be desirable to implement the MACsec functionality on newer generation of network infrastructure switches.

In computer networks, a tunneling protocol may allow a network user to access or provide a network service that the underlying network does not support or provide directly. One use of a tunneling protocol is to allow a foreign protocol to run over a network that does not support that particular protocol; for example, running IPv6 over IPv4. Tunnels may be used to connect remote, geographically separated sites over an existing network such as the Internet. A tunnel is a virtual link that connects two points, referred to as the tunnel entry and tunnel exist points. Packets enter the tunnel at the tunnel entry point and leave the tunnel at the exit point unchanged. Tunnels may create VPN overlay networks between remote sites and packets destined to remote private networks may encapsulated within a new IP header that is used to traverse the public internet. Generic Routing Encapsulation (GRE) is a tunneling protocol that can encapsulate a wide variety of network layer protocols inside virtual point-to-point links over an Internet Protocol network.

In an example, GRE hardware tunnels may be used to encapsulate user traffic from an access switch to a controller for advanced policy enforcement. These tunnels may carry user traffic as an unencrypted payload and given that a controller(s) may be placed anywhere in the network or even across Wide Area Network (WAN) links, lack of encryption capabilities on the wired switches may be considered a matter of concern in customer deployments that carry sensitive information across the network. Thus, securing payload information carried by these tunnels may be a desirable aspect.

To address these issues, the present disclosure describes various examples for using MACsec to encrypt tunnel data packets. In an example, a Media Access Control (MAC) Security (MACsec) capable device may receive a data packet from a host device for tunneling to a controller in a network. The MACsec capable device may encapsulate the data packet with an encapsulation header to generate an encapsulated data packet. The encapsulation header may comprise a destination MAC address reserved for the controller. The MACsec capable device may direct the encapsulated data packet to a MACsec engine on the MACsec capable device. The MACsec engine on the MACsec capable device may identify an encryption key corresponding to the controller based on the destination MAC address reserved for the controller. The MACsec engine on the MACsec capable device may encrypt the encapsulated data packet with the encryption key to generate an encrypted data packet. The MACsec capable device may encapsulate the encrypted data packet with a first Generic Routing Encapsulation (GRE) header. The MACsec capable device may send the encrypted data packet with the first GRE header to the controller via a GRE tunnel. In an example, the encrypted data packet may be processable by the controller to perform an action related to the data packet.

Figure 1:
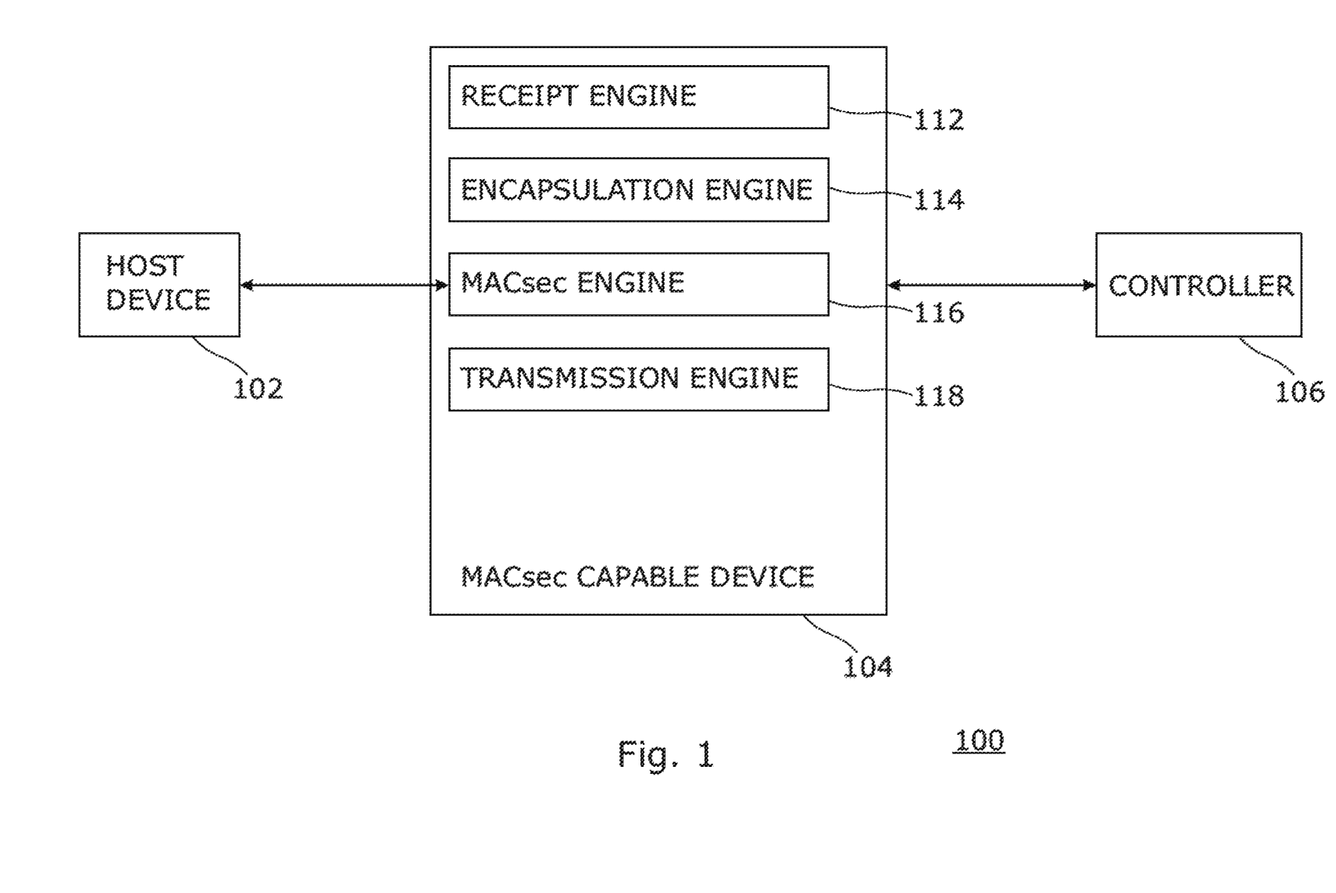
FIG. 1 illustrates a block diagram of an example computing environment using MACsec to encrypt tunnel data packets.

FIG. 1 illustrates a block diagram of an example computing environment using MACsec to encrypt tunnel data packets. The computing environment 100 may include a host device 102, a MACsec capable device 104, and a controller 106. Although one host device, one MACsec capable device, and one controller are shown in FIG. 1, other examples of this disclosure may include more than one host device, one MACsec capable device, and one controller. In an example, the functionalities performed by controller may be performed or shared by a plurality of controller nodes. In such case, controller 106 may represent a controller node amongst a plurality of controller nodes.

Host device 102 may represent any type of computing device capable of reading machine-executable instructions, for example, via a processor. Examples of the computing device may include, without limitation, a desktop computer, a notebook computer, a tablet computer, a server, a thin client, a mobile device, a personal digital assistant (PDA), and the like.

In an example, MACsec capable device 104 may be a network device. For example, MACsec capable device 104 may be a network switch, a network router, a virtual switch, and a virtual router. In another example, MACsec capable device 104 may be a computing device capable of executing machine-readable instructions. For example, MACsec capable device 104 may be a server, a desktop computer, a notebook computer, a tablet computer, a thin client, a mobile device, a personal digital assistant (PDA), and the like.

As used herein, a "MACsec capable device" may include a device that supports MACsec. As mentioned earlier, MACsec is the IEEE 802.1AE standard for authenticating and encrypting packets between two devices (for example, 104 and 106). A MACsec capable device (for example, 104) may support 802.1AE encryption with MACsec Key Agreement (MKA) on downlink ports, for example, for encryption between the MACsec capable device (for example, 104) and a host device (for example, 102).

MACsec standard may provide MAC-layer encryption over wired networks by using out-of-band methods for encryption keying. MACsec standard may include several protocols. These may include, for example, Extensible Authentication Protocol (EAP), MACsec Key Agreement (MKA), Security Association Protocol (SAP), EAP over LAN (EAPOL), Remote Authentication Dial-in User Service (RADIUS) protocol, etc.

The MKA Protocol manages the encryption keys used by the MACsec protocol. The MKA Protocol allows peer discovery with confirmation of mutual authentication and sharing of MACsec secret keys to protect data exchanged by the peers.

Controller 106 may represent any type of computing device capable of reading machine-executable instructions, for example, via a processor. Examples of the computing device may include, without limitation, a desktop computer, a notebook computer, a tablet computer, a server, a thin client, a mobile device, a personal digital assistant (PDA), and the like. In some examples, controller 106 may be a network device. For example, controller 106 may be a network switch or a network router.

Host device 102 and MACsec capable device 104 may be communicatively coupled, for example, via a computer network. The network may include, for example, a Local Area Network (LAN), a Wide Area Network (WAN), a Metropolitan Area Network (MAN), a Storage Area Network (SAN), a Campus Area Network (CAN), or the like. Further, the network may be a public network (for example, the Internet) or a private network (for example, an intranet). Likewise, MACsec capable device 104 and controller 106 may be communicatively coupled, for example, via a computer network similar to the one described above.

In some examples, MACsec capable device 104 may include a receipt engine 112, an encapsulation engine 114, a MACsec engine 116, and a transmission engine 118.

Engines 112, 114, 116, and 118 may include any combination of hardware and programming to implement the functionalities of the engines described herein. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of MACsec capable device 104. In some examples, the at least one machine-readable storage medium may store instructions that, when executed by the at least one processing resource, at least partially implement some or all engines of the computing device. In such examples, MACsec capable device 104 may include the at least one machine-readable storage medium storing the instructions and the at least one processing resource to execute the instructions.

In an example, receipt engine 112 on MACsec capable device 104 may receive a data packet(s) from host device 102 for tunneling to controller 106 in a network. The data packet may include a payload. In an example, the data packet may include an Ethernet packet.

Figure 2:
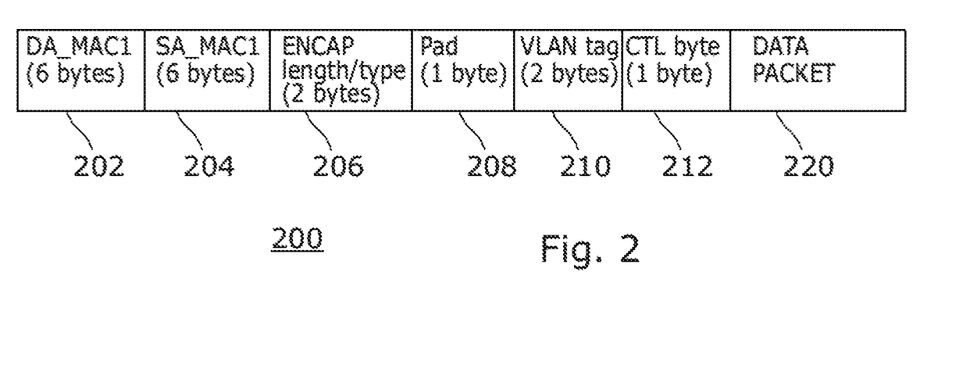
FIG. 2 illustrates a block diagram of an example encapsulation header along with a data packet.

In response, encapsulation engine 114 on MACsec capable device 104 may encapsulate the data packet with an encapsulation header to generate an encapsulated data packet. An example encapsulation header 200 along with a data packet 220 is illustrated in FIG. 2. The encapsulation header 200 may comprise a destination address field 202 that may include a destination MAC address, a source address field 204 that may include a source MAC address of the port on MACsec capable device 104 that receives the data packet, an Encaps length or type field 206 which may identify, for example, the protocol contained in the payload (for example, IPv4), a pad field 208 for byte alignment, a VLAN tag field 210, and a control byte field 212.

Once the data packet is encapsulated with the encapsulation header, encapsulation engine 114 may direct the encapsulated data packet to MACsec engine 116 on the MACsec capable device 104. In an example, the MACsec engine 116 includes a MACsec physical layer device (PHY) coupled to a port reserved to receive the encapsulated data packet on the MACsec capable device 104. Encapsulation engine 114 may direct the encapsulated data packet to an egress interface of MACsec engine 116.

In response, MACsec engine 116 may identify an encryption key corresponding to controller 106. In an example, for identifying the encryption key corresponding to the controller 106, MACsec engine 116 may identify the destination MAC address from the encapsulation header in the encapsulated data packet, and then look up a database (for example, a table) maintained on MACsec capable device 104 that stores a mapping between the destination MAC address reserved for controller 106 and the encryption key corresponding to the controller 106. In case a plurality of controller nodes are present on the network, the database may store a mapping between respective destination MAC addresses of controller nodes and encryption keys corresponding thereto. Based on the mapping, the encryption key corresponding to controller 106 may be identified. In an example, the encryption key corresponding to the controller is a pre-shared key between MACsec capable device 104 and controller 106. In another example, the encryption key corresponding to the controller may be dynamically shared between MACsec capable device 104 and controller 106. For example, Internet Key Exchange (IKE) protocol may be used to dynamically share the encryption key.

Figure 3:
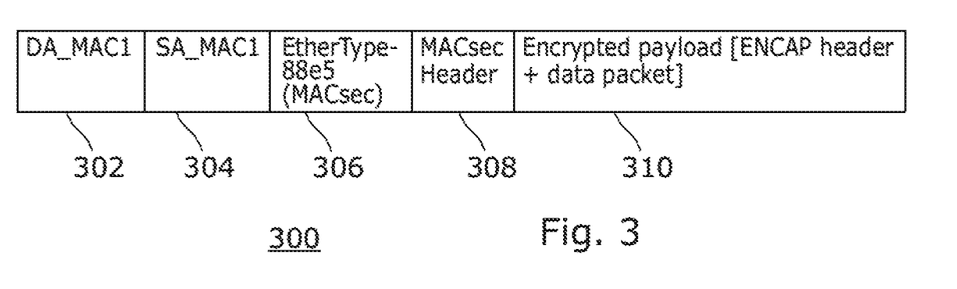
FIG. 3 illustrates a block diagram of an example encrypted data packet.

In response to the identification, MACsec engine 116 may encrypt the encapsulated data packet with the encryption key to generate an encrypted data packet. An example encrypted data packet 300 is illustrated in FIG. 3. The encrypted data packet 300 may comprise a destination address field 302 that may include a destination MAC address, a source address field 304 that may include a source MAC address of the port on MACsec capable device 104 that receives the data packet, a length or type field 306, a MACsec header field 308, an encrypted payload 310. In an example, if a plurality of controllers are present on the network and each controller shares the same encryption key, MACsec engine may directly encrypt the data packet without encapsulating the data packet with an encapsulation header.

In an example, MACsec engine 116 may be programmed to operate in a loopback mode. In the loopback mode, the encrypted data packet may be looped back to the same reserved port. The encrypted data packet may be routed to the ingress interface of MACsec engine 116. On the ingress interface, the encrypted data packet may bypass the standard decryption process by MACsec engine due to the pass through mode enabled on the port. The pass through mode enables bypassing of MACsec decryption on the ingress interface. A Ternary Content Addressable Memory (TCAM) rule in an ASIC of MACsec capable device 104 may be used to forward the encrypted data packet to encapsulation engine 114 based on the source MAC address of the receiving port and the destination MAC address reserved for controller 106.

Figure 4:
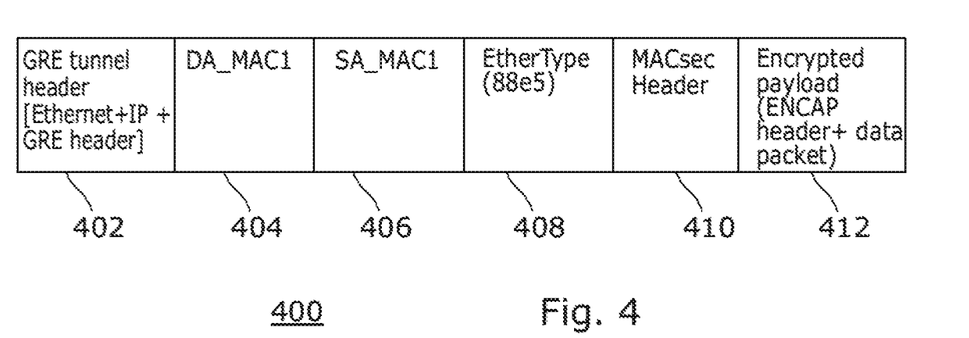
FIG. 4 illustrates a block diagram of an example encrypted data packet along with a first GRE header.

In response, encapsulation engine 114 may encapsulate the encrypted data packet with a header. In an example, the header may include a first Generic Routing Encapsulation (GRE) header. Encapsulation engine 114 may use the source MAC address of the egress port and the destination MAC address of controller 106 to generate the first GRE header. An example of the encrypted data packet 400 along with the first GRE header 412 is illustrated in FIG. 4. The encrypted data packet 400 along with the first GRE header 412 may comprise a destination address field 402 that may include a destination MAC address, a source address field 404 that may include a source MAC address of the port on MACsec capable device 104 that receives the data packet, an Encaps length or type field 406, a MACsec header field 408, and an encrypted payload 410.

Transmission engine 118 may send the encrypted data packet with the first GRE header to controller 106 via a GRE tunnel. The encrypted data packet may be processed by controller 106 to perform an action related to the data packet. The action may be performed on the payload in the data packet. Examples of the action performed by controller 106 may relate to authentication, access control, policy enforcement, and firewall inspection. In an example, processing of the encrypted data packet on controller 106 may involve decapsulating the first GRE header from the encrypted data packet, and then decrypting the encrypted data packet. Controller 106 may ignore the encapsulation header and process the data packet to generate a processed data packet. Controller 106 may then encrypt the processed data packet to generate an encrypted processed data packet. The encrypted data packet may be encapsulated with a second GRE header by controller 106. The second GRE header may include an IP address of MACsec capable device 104 in the destination address field. Controller 106 may send the encrypted processed data packet with the second GRE header to MACsec capable device 104.

In an example, receipt engine 112 may receive the encrypted processed data packet from controller 106. The encrypted processed data packet is encapsulated with the second GRE header. On receipt, decapsulation engine may decapsulate the second GRE header from the encrypted processed data packet. After decapsulation removes the second GRE header, encapsulation engine 114 may forward the encrypted processed data packet to the same reserved port on MACsec capable device 104 that was used for encapsulating the data packet with the encapsulation header. From the egress interface of MACsec engine 116, the encrypted data packet may be looped back to the ingress interface. On the ingress interface of MACsec engine 116, the encrypted processed data packet may be decrypted to generate the processed data packet. MACsec engine 116 may select the same controller node key that was earlier used to encrypt the data packet for decrypting the encrypted processed data packet. In an example, MACsec engine 116 may identify the same controller node key based on an identifier present in the encrypted processed data packet. In an example, the identifier may include a Secure Channel Identifier (explained below) present in the encrypted processed data packet. Upon decryption, transmission engine 118 may send the processed data packet to host device 102.

A Connectivity Association (CA) may be a logical association between two or more MACsec participating entities (for example, MACsec capable device 104 and controller 106). A secure Connectivity Association (CA) may be defined as a security relationship, established and maintained by key agreement protocols, that comprises a fully connected subset of the service access points in stations attached to a single LAN that are to be supported by MACsec. Members of a CA may be identified via a secret key called as secure Connectivity Association Key (CAK). A CAK may be identified via a secure Connectivity Association Key Name (CKN), which may be of 1 to 32 octets. Only entities with same pair of CAK and CKN may be able to form a CA.

A CA may be realized via Secure Channels (SC) between two or more MACsec entities participating in a CA. A secure channel" may refer to a security relationship used to provide security guarantees for frames transmitted from one member of a CA to the others. There may be one SC ("Transmit SC") for secure transmission of frames from a MACsec entity to all other devices in a CA. However, there may be one or multiple SCs ("Receive SCs") for receiving frames from other devices in a CA. Each SC may be identified via a Secure Channel Identifier (SCI), which may be a globally unique identifier for a secure channel, comprising a globally unique MAC Address and a Port Identifier, unique within the system that has been allocated that address. A SC remains alive until the two entities participate in the MACsec CA.

Figure 5:
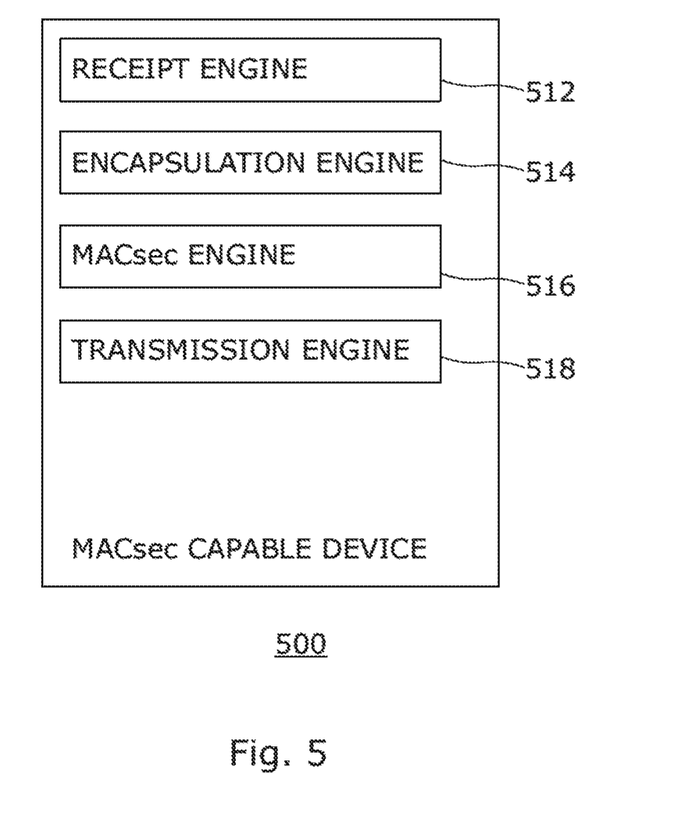
FIG. 5 is a block diagram of an example MACsec capable device using MACsec to encrypt tunnel data packets.

FIG. 5 is a block diagram of an example MACsec capable device 500 using MACsec to encrypt tunnel data packets. In an example, MACsec capable device 500 may be analogous to MACsec capable device 104 of FIG. 1, in which like reference numerals correspond to the same or similar, though perhaps not identical, components. For the sake of brevity, components or reference numerals of FIG. 5 having a same or similarly described function in FIG. 1 are not being described in connection with FIG. 5. Said components or reference numerals may be considered alike.

In an example, MACsec capable device 500 may be a network device. For example, MACsec capable device 500 may be a network switch, a network router, a virtual switch, and a virtual router. In another example, MACsec capable device 500 may be a computing device capable of executing machine-readable instructions. For example, MACsec capable 500 device may be a server, a desktop computer, a notebook computer, a tablet computer, a thin client, a mobile device, a personal digital assistant (PDA), and the like.

In an example, MACsec capable device 500 may include a receipt engine 512, an encapsulation engine 514, a MACsec engine 516, and transmission engine 518. In an example, a receipt engine 512, encapsulation engine 514, MACsec engine 516, and transmission engine 518 may perform functionalities similar to those described earlier in reference to receipt engine 112, encapsulation engine 114, MACsec engine 116, and transmission engine 118 of FIG. 1, respectively.

In an example, receipt engine 512 may receive a data packet from a host device (for example, 102) for tunneling to a controller (for example, 106) 106 in a network. Encapsulation engine 514 may encapsulate the data packet with an encapsulation header to generate an encapsulated data packet. The encapsulation header may comprise a destination MAC address reserved for the controller. The encapsulation engine 514 may direct the encapsulated data packet to a MACsec engine 516 on the MACsec capable device. MACsec engine 516 may identify an encryption key corresponding to the controller based on the destination MAC address reserved for the controller. MACsec engine 516 may encrypt the encapsulated data packet with the encryption key to generate an encrypted data packet.

Encapsulation engine 514 may encapsulate the encrypted data packet with a first Generic Routing Encapsulation (GRE) header. Transmission engine 518 may send the encrypted data packet with the first GRE header to the controller via a GRE tunnel. The encrypted data packet may be processable by the controller to perform an action related to the data packet.

In an example, receipt engine 512 may receive an encrypted processed data packet from the controller, wherein the encrypted processed data packet may be encapsulated with a second GRE header. Encapsulation engine 514 may decapsulate the second GRE header from the encrypted processed data packet. MACsec engine 516 may decrypt the encrypted processed data packet to generate the processed data packet. Transmission engine 518 may send the processed data packet to the host device.

Figure 6:
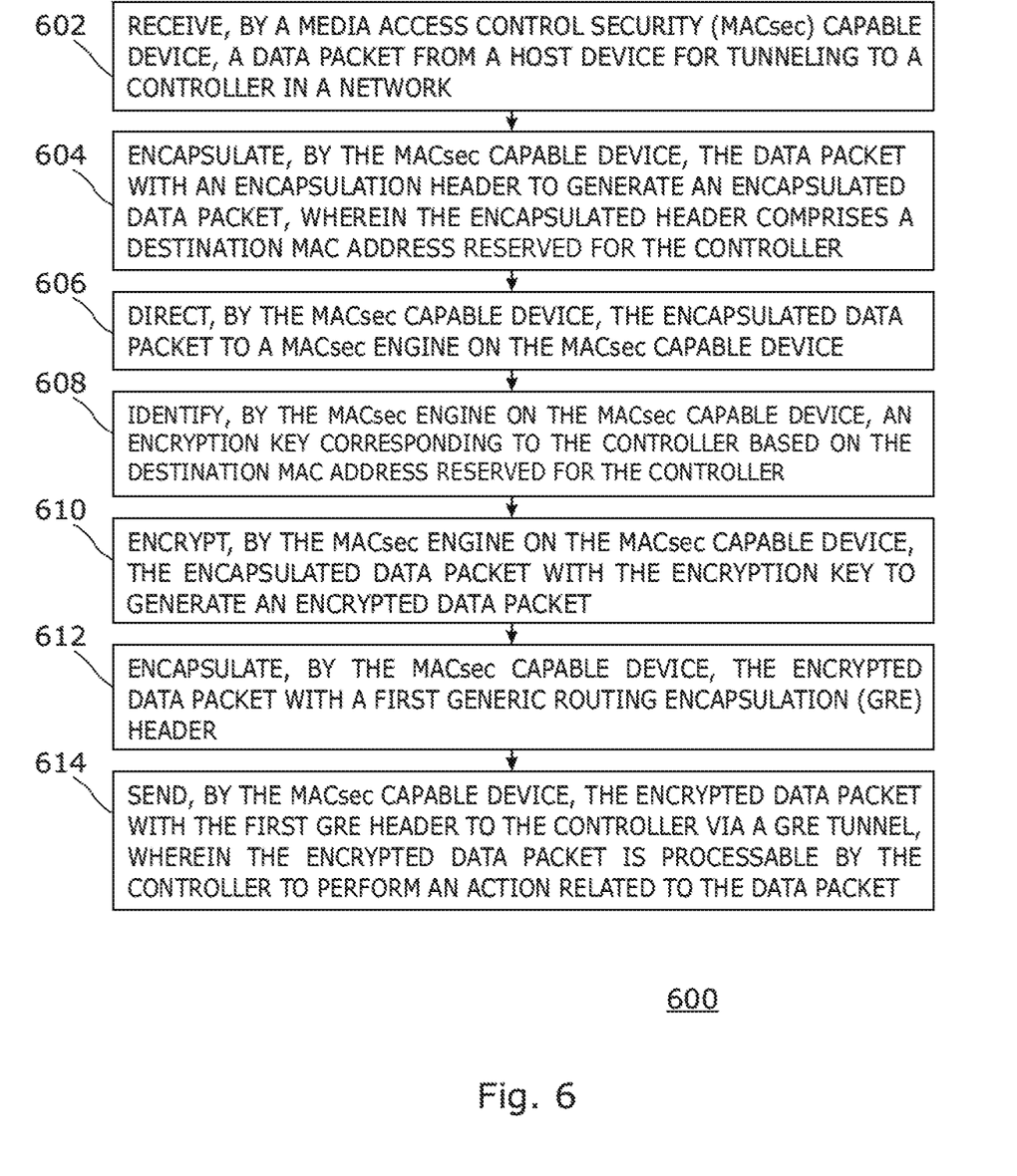
FIG. 6 is a flow chart of an example method of using MACsec to encrypt tunnel data packets.

FIG. 6 is a flow chart of an example method 600 of using MACsec to encrypt tunnel data packets. The method 600, which is described below, may be partially or completely executed on a computing device such as MACsec capable device 104 of FIG. 1 or 500 of FIG. 5. However, other suitable computing devices may execute method 600 as well.

At block 602, a Media Access Control (MAC) Security (MACsec) capable device may receive a data packet from a host device for tunneling to a controller in a network. At block 604, the MACsec capable device may encapsulate the data packet with an encapsulation header to generate an encapsulated data packet. The encapsulation header may comprise a destination MAC address reserved for the controller. At block 606, the MACsec capable device may direct the encapsulated data packet to a MACsec engine on the MACsec capable device. At block 608, the MACsec engine on the MACsec capable device may identify an encryption key corresponding to the controller based on the destination MAC address reserved for the controller. At block 610, the MACsec engine on the MACsec capable device may encrypt the encapsulated data packet with the encryption key to generate an encrypted data packet. At block 612, the MACsec capable device may encapsulate the encrypted data packet with a first Generic Routing Encapsulation (GRE) header. At block 614, MACsec capable device may send the encrypted data packet with the first GRE header to the controller via a GRE tunnel. In an example, the encrypted data packet may be processable by the controller to perform an action related to the data packet.

Figure 7:
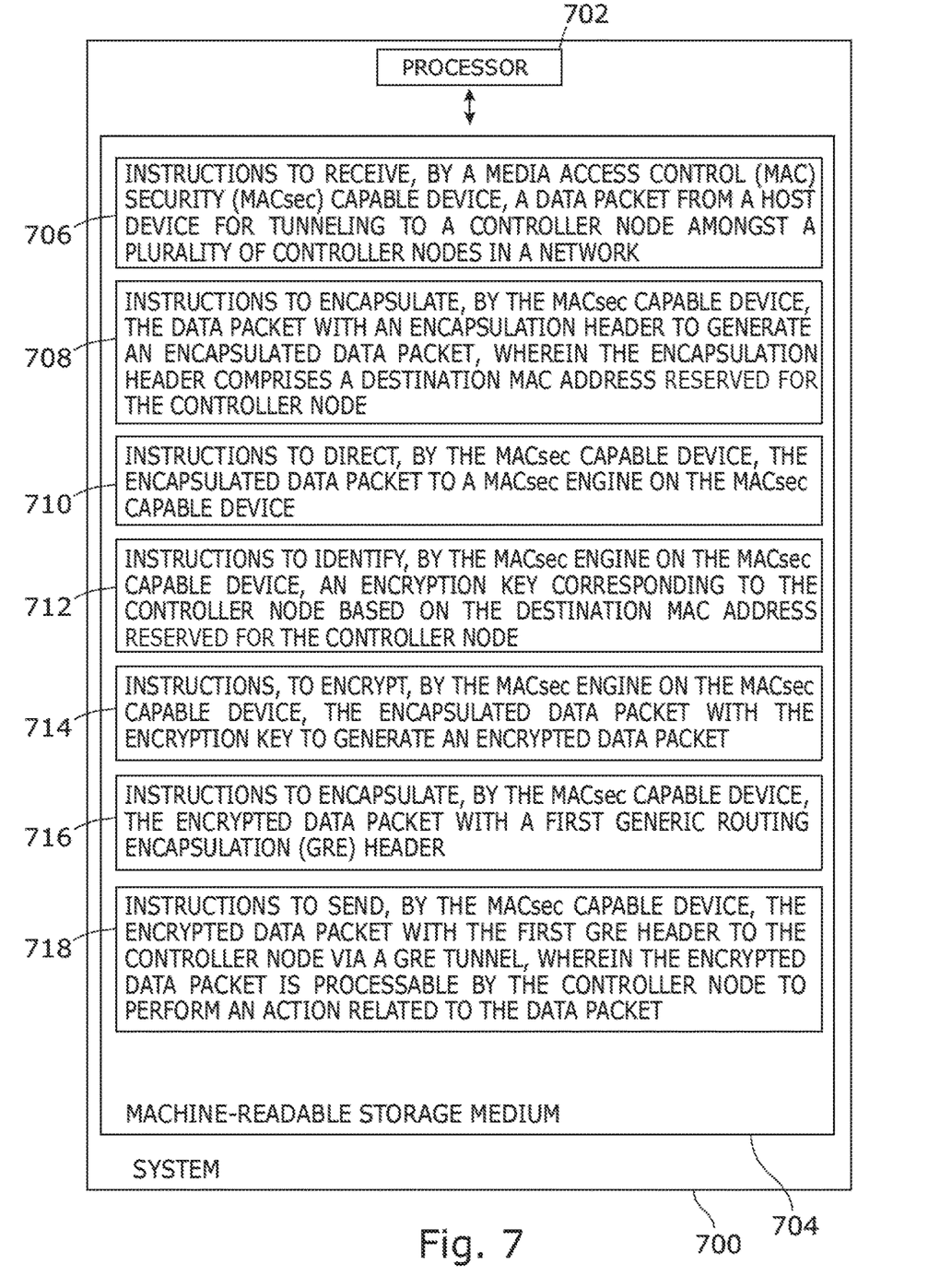
FIG. 7 is a block diagram of an example system including instructions in a machine-readable storage medium for using MACsec to encrypt tunnel data packets.

FIG. 7 is a block diagram of an example system 700 including instructions in a machine-readable storage medium using MACsec to encrypt tunnel data packets. System 700 includes a processor 702 and a machine-readable storage medium 704 communicatively coupled through a system bus. In an example, system 700 may be analogous to MACsec capable device 104 of FIG. 1, or 500 of FIG. 5. Processor 702 may be any type of Central Processing Unit (CPU), microprocessor, or processing logic that interprets and executes machine-readable instructions stored in machine-readable storage medium 704. Machine-readable storage medium 704 may be a random access memory (RAM) or another type of dynamic storage device that may store information and machine-readable instructions that may be executed by processor 702. For example, machine-readable storage medium 704 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 704 may store instructions 706, 708, 710, 712, 714, 716, and 718. In an example, instructions 706 may be executed by processor 702 to receive, by a Media Access Control (MAC) Security (MACsec) capable device, a data packet from a host device for tunneling to a controller node amongst a plurality of controller nodes in a network. Instructions 708 may be executed by processor 702 to encapsulate, by the MACsec capable device, the data packet with an encapsulation header to generate an encapsulated data packet. The encapsulation header may comprise a destination MAC address reserved for the controller node. Instructions 710 may be executed by processor 702 to direct, by the MACsec capable device, the encapsulated data packet to a MACsec engine on the MACsec capable device.

Instructions 712 may be executed by processor 702 to identify, by the MACsec engine on the MACsec capable device, an encryption key corresponding to the controller node based on the destination MAC address reserved for the controller node. Instructions 714 may be executed by processor 702 to encrypt, by the MACsec engine on the MACsec capable device, the encapsulated data packet with the encryption key to generate an encrypted data packet.

Instructions 716 may be executed by processor 702 to encapsulate, by the MACsec capable device, the encrypted data packet with a first Generic Routing Encapsulation (GRE) header. Instructions 718 may be executed by processor 702 to send, by the MACsec capable device, the encrypted data packet with the first GRE header to the controller node via a GRE tunnel. The encrypted data packet may be processable by the controller node to perform an action related to the data packet.

For the purpose of simplicity of explanation, the example method of FIG. 6 is shown as executing serially, however it is to be understood and appreciated that the present and other examples are not limited by the illustrated order. The example systems of FIGS. 1, 5, and 7, and method of FIG. 6 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the stages of any method or process so disclosed, may be combined in any combination, except combinations where at least some of such features and/or stages are mutually exclusive.

The invention claimed is:

1. A method comprising:
receiving, by a Media Access Control (MAC) Security (MACsec) capable device, a data packet from a host device for tunneling to a controller in a network;
encapsulating, by the MACsec capable device, the data packet with a layer-2 encapsulation header to generate an encapsulated data packet, wherein the layer-2 encapsulation header comprises a destination MAC address of the controller;
identifying, by the MACsec capable device, an encryption key corresponding to the controller based on the destination MAC address;
encrypting, by the MACsec capable device, the encapsulated data packet with the encryption key to generate an encrypted data packet based on a MACsec protocol;
encapsulating, by the MACsec capable device, the encrypted data packet with a tunnel header; and
sending, by the MACsec capable device, the encrypted data packet to the controller via a tunnel corresponding to the tunnel header.

2. The method of claim 1, further comprising:
receiving, by the MACsec capable device, an encapsulated data packet from the controller, wherein the encapsulated data pack
\\aqqaet is encapsulated with a second tunnel header;
decapsulating, by the MACsec capable device, the second tunnel header to obtain an encrypted processed data packet;
decrypting, by the MACsec capable device, the encrypted processed data packet to generate a processed data packet; and
sending, by the MACsec capable device, the processed data packet to the host device.

3. The method of claim 1, wherein encrypting the encapsulated data packet comprises:
encrypting the encapsulated data packet on an egress interface of the MACsec capable device.

4. The method of claim 1, further comprising:
looping the encrypted data packet back to a port on the MACsec capable device, wherein the port is configured to receive encapsulated data packets.

5. The method of claim 4, further comprising:
bypassing decryption of the encrypted data packet on the port of the MACsec capable device.

6. The method of claim 1, wherein identifying the encryption key comprises:
accessing a database on the MACsec capable device that stores a mapping between the destination MAC address and the encryption key; and
looking up the destination MAC address in the database to identify the mapping.

7. The method of claim 1, wherein the layer-2 encapsulation header comprises a source MAC address allocated to a port on the MACsec capable device that receives the data packet from the host device.

8. A MACsec capable device comprising:
communication circuitry configured to receive a data packet from a host device for tunneling to a controller in a network;
encapsulation circuitry configured to encapsulate the data packet with a layer-2 encapsulation header to generate an encapsulated data packet, wherein the layer-2 encapsulation header comprises a destination MAC address of the controller;
encryption circuitry configured to:
identify an encryption key corresponding to the controller based on the destination MAC address;
encrypt the encapsulated data packet with the encryption key to generate an encrypted data packet based on a MACsec protocol;
tunneling circuitry configured to encapsulate the encrypted data packet with a tunnel header; and
wherein the communication circuitry is further configured to send the encrypted data packet to the controller via a tunnel corresponding to the tunnel header.

9. The MACsec capable device of claim 8, wherein the layer-2 encapsulation header comprises a source MAC address allocated to a port on the MACsec capable device that receives the data packet from the host device.

10. The MACsec capable device of claim 8,
wherein the communication circuitry is further configured to receive an encapsulated data packet from the controller, wherein the encapsulated data packet is encapsulated with a second tunnel header;
wherein the encapsulation circuitry is further configured to decapsulate the second tunnel header to obtain an encrypted processed data packet;
wherein the encapsulation circuitry is further configured to decrypt the encrypted processed data packet to generate a processed data packet; and
wherein the communication circuitry is further configured to send the processed data packet to the host device.

11. The MACsec capable device of claim 10, wherein the encryption circuitry is configured to identify the encryption key by looking up the destination MAC address in a database.

12. The MACsec capable device of claim 8, wherein the encryption circuitry is further configured to encrypt the encapsulated data packet on an egress interface of the MACsec capable device.

13. The MACsec capable device of claim 8, wherein the communication circuitry is further configured to loop the encrypted data packet back to a port on the MACsec capable device, wherein the port is configured to receive encapsulated data packets.

14. The MACsec capable device of claim 13, wherein the encryption circuitry is further configured to bypass decryption of the encrypted data packet on the port of the MACsec capable device.

15. A non-transitory machine-readable storage medium comprising instructions, the instructions executable by a processor to execute a method, the method comprising:
receiving, by a Media Access Control (MAC) Security (MACsec) capable device, a data packet from a host device for tunneling to a controller node amongst a plurality of controller nodes in a network;
encapsulating, by the MACsec capable device, the data packet with a layer-2 encapsulation header to generate an encapsulated data packet, wherein the layer-2 encapsulation header comprises a destination MAC address reserved for the controller node;
identifying, by the MACsec capable device, an encryption key corresponding to the controller node based on the destination MAC address;

encrypting, by the MACsec capable device, the encapsulated data packet with the encryption key to generate an encrypted data packet based on a MACsec protocol;

encapsulating, by the MACsec capable device, the encrypted data packet with a tunnel header; and sending, by the MACsec capable device, the encrypted data packet to the controller node via a tunnel corresponding to the tunnel header.

16. The non-transitory machine-readable storage medium of claim 15, wherein the encapsulated data packet is encrypted at an egress interface of the MACsec capable device.

17. The non-transitory machine-readable storage medium of claim 15, wherein the layer-2 encapsulation header comprises a source MAC address i allocated to a port on the MACsec capable device that receives the data packet from the host device.

18. The non-transitory machine-readable storage medium of claim 15, wherein the method further comprises encrypting the encapsulated data packet on an egress interface of the MACsec capable device.

19. The non-transitory machine-readable storage medium of claim 15, wherein the method further comprises:

accessing a database on the MACsec capable device that stores a mapping between the destination MAC address and the encryption key; and looking up the destination MAC address in the database to identify the mapping.

20. The non-transitory machine-readable storage medium of claim 15, wherein the method further comprises bypassing decryption of the encrypted data packet on a port of the MACsec capable device, wherein the port is configured to receive encapsulated data packets.

* * * * *